(12) United States Patent
Zadeh et al.

(10) Patent No.: US 8,869,637 B2
(45) Date of Patent: Oct. 28, 2014

(54) ELECTRIC GENERATOR AND METHOD FOR INSPECTING AN ELECTRIC GENERATOR

(75) Inventors: Hossein Safari Zadeh, Othmarsingen (CH); Damir Novosel, Möriken (CH)

(73) Assignee: Alstom Technology Ltd, Baden (CH)

( * ) Notice: Subject to any disclaimer, the term of this patent is extended or adjusted under 35 U.S.C. 154(b) by 643 days.

(21) Appl. No.: 13/038,523

(22) Filed: Mar. 2, 2011

(65) Prior Publication Data

US 2011/0226072 A1 Sep. 22, 2011

(30) Foreign Application Priority Data

Mar. 19, 2010 (EP) ..................... 10157017

(51) Int. Cl.
| | |
|---|---|
| *H02K 5/22* | (2006.01) |
| *H02K 5/04* | (2006.01) |
| *H02K 15/14* | (2006.01) |
| *H02K 15/00* | (2006.01) |

(52) U.S. Cl.
CPC .. *H02K 5/22* (2013.01); *H02K 5/04* (2013.01); *H02K 15/14* (2013.01); *H02K 15/00* (2013.01)
USPC .......................................... 73/865.8; 310/89

(58) Field of Classification Search
CPC ........... H02K 5/04; H02K 5/22; H02K 15/14; H02K 2005/04; H02K 2211/00
USPC ................ 73/865.8–865.9; 310/89
See application file for complete search history.

(56) References Cited

U.S. PATENT DOCUMENTS

| | | | | |
|---|---|---|---|---|
| 2,152,586 | A * | 3/1939 | Freeman .......................... | 310/88 |
| 2,519,687 | A * | 8/1950 | Miller ............................ | 451/557 |
| 2,789,234 | A * | 4/1957 | Davies et al. .................. | 290/1 R |
| 2,799,782 | A * | 7/1957 | Armstrong et al. ........... | 290/1 B |
| 3,096,648 | A | 5/1960 | Dombeck et al. | |
| 3,373,610 | A | 3/1964 | Stieber | |
| 3,206,627 | A * | 9/1965 | Marek ............................. | 310/59 |
| 3,464,218 | A * | 9/1969 | Buck ............................... | 62/3.2 |
| 4,231,419 | A * | 11/1980 | Gugel ........................... | 165/11.2 |
| 5,033,511 | A * | 7/1991 | Cacciuttolo et al. ............ | 138/97 |
| 5,491,316 | A * | 2/1996 | Boula et al. ............... | 219/121.13 |
| 5,642,702 | A * | 7/1997 | Kouchi et al. ............. | 123/198 E |
| 7,071,586 | B2 | 7/2006 | Hattori et al. | |
| 2005/0284610 | A1 * | 12/2005 | Doule et al. .................... | 165/82 |

(Continued)

FOREIGN PATENT DOCUMENTS

| | | | | |
|---|---|---|---|---|
| CA | 1138302 A | * | 12/1982 | ............. F03B 13/08 |
| DE | 2260656 A | * | 6/1974 | ................ F23H 3/04 |

(Continued)

OTHER PUBLICATIONS

European Search Report for EP Patent App. No. 10157107.4 (Aug. 27, 2010).

*Primary Examiner* — Thomas P Noland
(74) *Attorney, Agent, or Firm* — Buchanan Ingersoll & Rooney PC

(57) ABSTRACT

An electric generator (1) includes a casing (2) that envelops a stator (3) and a rotor (4). The casing (2) has an aperture (5) through which the generator casing inside (7) is inspectable during generator operation. A method includes inspecting during generator operation, through the aperture (5) of the casing (2), the casing inside (7).

18 Claims, 2 Drawing Sheets

(56) References Cited

U.S. PATENT DOCUMENTS

2007/0002133 A1* 1/2007 Metala et al. .................. 348/61
2011/0175641 A1* 7/2011 Wiesendanger
 et al. ...................... 324/765.017
2013/0335551 A1* 12/2013 Mandier et al. ................ 348/84

FOREIGN PATENT DOCUMENTS

| EP | 1850649 | A1 * | 10/2007 | ............... H05K 9/00 |
| GB | 171430 | | 11/1921 | |
| JP | 52-103304 | | 8/1977 | |
| WO | WO 2008024686 | A2 * | 2/2008 | ............... H02K 7/18 |

* cited by examiner

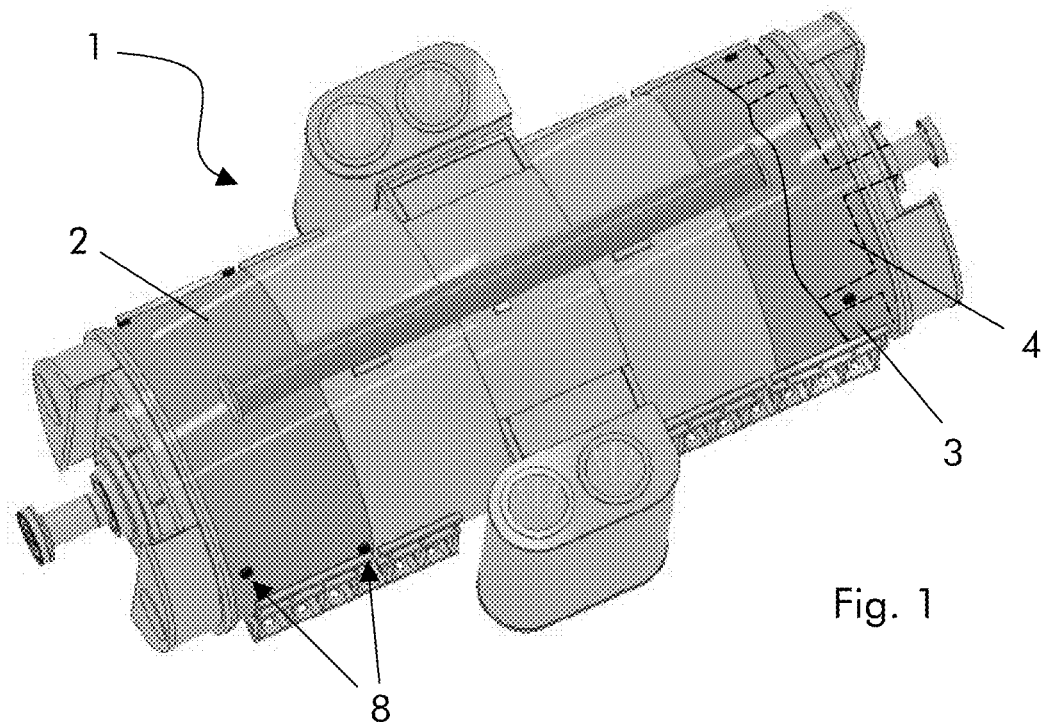
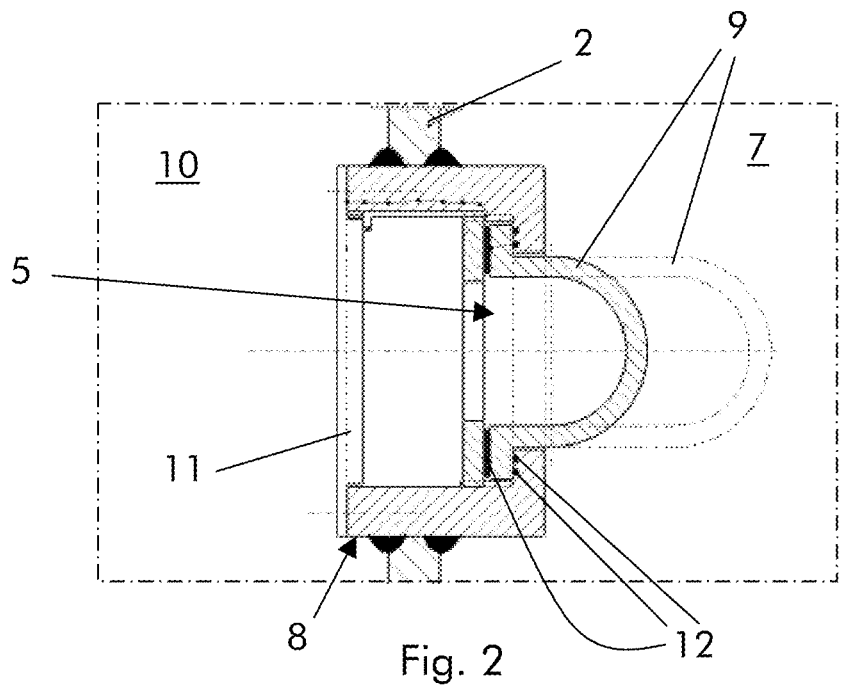

ELECTRIC GENERATOR AND METHOD FOR INSPECTING AN ELECTRIC GENERATOR

This application claims priority under 35 U.S.C. §119 to European Application No. 10157017.4, filed 19 Mar. 2010, the entirety of which is incorporated by reference herein.

BACKGROUND

1. Field of Endeavor

The present invention relates to an electric generator and a method for inspecting an electric generator.

2. Brief Description of the Related Art

Electric generators are known to have a casing that houses a stator and a rotor.

The rotor supports a fan that, during operation, makes the gas (typically air or hydrogen) contained within the casing circulate, in order to cool down the stator and rotor.

The casing is usually provided with a door, to allow operators to enter it, for example for maintenance operations.

In this respect, when periodical maintenance operations are carried out, the operators enter the generator casing and, after having checked the stator, rotor and the other components inside of the casing, carry out the needed maintenance operations.

It is clear that this procedure requires generator outages that are disproportionately long when compared to the maintenance operations to be effectively carried out, since the operators can discover the damaged or troubling parts, to then collect possible spare parts that could also not be available, only when they actually access the inner of the casing.

In addition, since during generator operation the inside of the casing cannot be accessed, in case problems arise, it is not possible to check the conditions of the stator, rotor or other components inside of the casing.

SUMMARY

One on numerous aspects of the present invention includes an electric generator and a method for inspecting an electric generator by which the aforementioned problems of the known art are addressed.

Another aspect of the present invention is to provide an electric generator and a method with which generator outages for periodic maintenance operations can be reduced, without reducing the quality of the maintenance and, in other words, without reducing the time that operators spend for maintenance operations.

Another aspect of the invention includes an electric generator and a method permitting access to the inside of the generator casing, to check the stator, rotor or other component conditions also during generator operation, without the need for stopping it.

BRIEF DESCRIPTION OF THE DRAWINGS

Further characteristics and advantages of the invention will be more apparent from the description of a preferred but non-exclusive embodiment of the invention, illustrated by way of non-limiting example in the accompanying drawings, in which:

FIG. 1 is a schematic perspective view of a generator in an embodiment of the invention;

FIGS. 2 and 3 are two cross sections of a portion of FIG. 1;

DETAILED DESCRIPTION OF EXEMPLARY EMBODIMENTS

Figure 3:
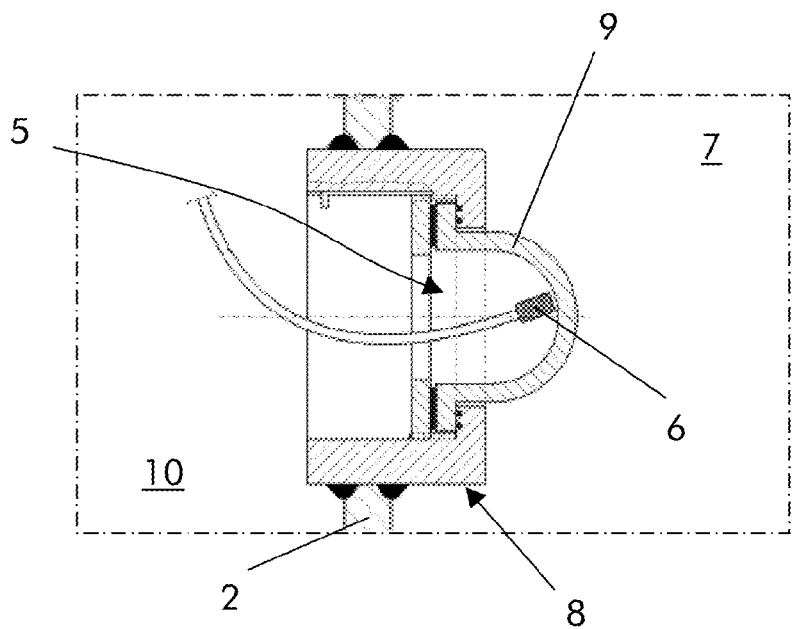
Figure 4:
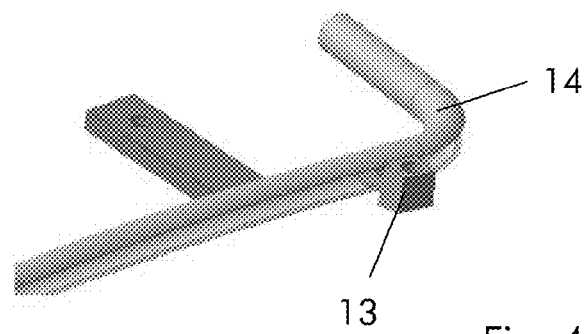
FIG. 4 is a perspective view of a guide with a sensor that can be provided within the generator casing.
Figure 5:
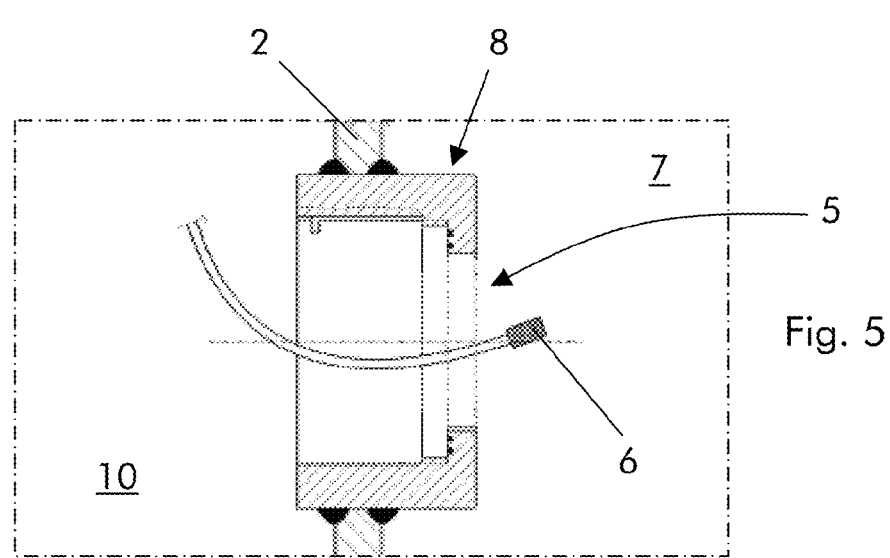
FIG. 5 is a cross section of a portion of the generator in a different embodiment.

With reference to the figures, an electric generator 1 having a casing 2 that envelops a stator 3 and a rotor 4 is illustrated.

The casing 2 has an aperture 5, through which the generator casing inside 7 can be inspected during generator operation from the outside.

Specifically, through the aperture 5, sensors 6 can access the casing inside 7 during generator operation.

The aperture 5 is defined in a flange 8 connected to the casing 2 and having a box-like structure.

Advantageously, the aperture 5 is provided with a transparent element 9 (for example made out of glass) having a curved cross section. As shown in the figures, the curved cross section is preferably a U-shaped cross section, with its central portion projecting inside of the casing 2; FIG. 2 shows a first embodiment of the transparent element 9 in solid line and a second embodiment in dashed line.

The transparent element 9 is connected to a side of the box-like structure flange 8 towards the casing inside 7; in contrast, a side of the box-like structure flange 8 towards the casing outside 10 (air side) is provided with a covering 11.

The covering 11 can be closed during normal generator operation (FIG. 2) to be opened only when needed (for example FIG. 3 shows an example with the covering 11 removed to allows a sensor 6 to access the aperture 5); this allows the transparent element 9 to be protected, for example from dust.

The embodiment of the generator described above is particularly adapted to be implemented in a sealed, hydrogen-cooled generator.

Thus, preferably, seals 12 are also provided, to prevent the hydrogen from moving out from the generator casing inside 7.

The operation of the electric generator with the aperture 5 in this embodiment is apparent from what described and illustrated and is substantially the following.

During normal operation the covering 11 covers the aperture 5 to protect the transparent element 9 (FIG. 2).

In case the casing inside 7 of the generator must be checked, for example in advance of maintenance operations (that require the generator to be stopped and the casing to be opened to be directly accessed by operators) the covering 11 is removed and a sensor 6 is introduced into the box-like structure flange 8 (FIG. 3). As shown, the sensor 6 does not overcome the transparent element 9.

Thus the sensor 6 can execute measurements or monitoring operations.

The sensor 6 can be a camera, to watch the generator casing inside 7 without the need of opening the casing 2 (since, for hydrogen cooled generators, opening the casing 2 may require also more than one or two days).

Other sensors that can be used are electric or magnetic field strength sensors, to execute the corresponding measurements, or boroscopes.

Modifications and variants in addition to those already stated are possible.

For example, in case the generator is an air cooled generator, the box-like structure flange 8 may also be free of the covering 11 and transparent element 9.

In this case, during operation a sensor 6 can directly access the casing inside 7 of the generator 1.

This, in addition to the already described inspection/observation, also makes possible, when the transparent element 9 is provided, further very localized measurements.

In particular embodiments, the electric generator 1 may also be provided with internal sensors 13, i.e., sensors that are housed within the generator casing 2.

In this case, within the generator casing 2 the internal sensors 13 have to withstand large forces due to the cooling gas; for this reason, the sensors 13 are connected (either in a fixed manner or in a slidable manner) to guides 14.

For the same reason (i.e., forces exercised by the cooling gas) it is very important to also have the possibility to directly monitor the sensors 13 (for example using cameras facing the aperture 5) in order to operate in safe conditions.

Naturally the sensors 13 may also be introduced into the casing inside 7 and connected to the guides 14 only when needed through the aperture 5.

The present invention also relates to a method for inspecting an electric generator.

The method includes inspecting, through the aperture 5 of the casing 2, the generator casing inside 7 during generator operation.

Naturally the features described may be independently provided from one another.

Advantageously the flange with the aperture may be applied on new and also existing generators (post manufacturing); in addition, they can be installed anywhere in accordance with the internal requirements.

In practice the materials used and the dimensions can be chosen at will according to requirements and to the state of the art.

REFERENCE NUMBERS 1 electric generator
2 casing
3 stator
4 rotor
5 aperture
6 sensor/boroscope/camera
7 casing inside
8 flange
9 transparent element
10 casing outside (air side)
11 covering
12 seals
13 internal sensor
14 guide While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

We claim:

1. An electric generator comprising:
   a stator, a rotor, and a casing that envelops the stator and the rotor;
   wherein said casing comprises at least one aperture through which the generator casing inside is inspectable during generator operation; and
   internal sensors housed within the casing, the internal sensors being connected to guides within the casing.

2. An electric generator as claimed in claim 1, wherein:
   the casing comprises a flange; and
   said at least one aperture is defined in the casing flange.

3. An electric generator as claimed in claim 2, wherein the flange has a box-like structure.

4. An electric generator as claimed in claim 1, further comprising:
   a transparent element in the at least one aperture.

5. An electric generator as claimed in claim 4, wherein said transparent element has a curved cross section.

6. An electric generator as claimed in claim 5, wherein said curved cross section is a U-shaped cross section including a central portion projecting inside of the casing.

7. An electric generator as claimed in claim 4, wherein said transparent element is connected to a side of a box-like structure flange towards the casing inside.

8. An electric generator as claimed in claim 7, further comprising:
   a covering on a side of the box-like structure flange towards the casing outside.

9. A method for inspecting an electric generator which has a casing that envelops a stator and a rotor, the method comprising:
   inspecting the casing inside through an aperture of the casing during generator operation; and
   wherein the electric generator has internal sensors housed within the casing, the internal sensors being connected to guides within the casing.

10. The method of claim 9, wherein the aperture of the casing is an aperture defined in a flange connected to the casing.

11. The method of claim 10, wherein the flange has a box-like structure.

12. A method for inspecting an electric generator which has a casing that envelops a stator and a rotor, the method comprising:
   inspecting the casing inside through an aperture of the casing during generator operation;
   moving a covering to expose the aperture;
   inserting at least one sensor through the aperture to position the sensor adjacent a transparent element positioned within the aperture after moving the covering to expose the aperture; and
   wherein the inspecting of the casing inside through the aperture of the casing during generator operation comprises:
   executing measurements using the sensor after the sensor is inserted through the aperture while the generator is operating.

13. The method of claim 12, wherein the at least one sensor is comprised of at least one of a camera, a magnetic field strength sensor, an electric field strength sensor, and a boroscope.

14. A method for inspecting an electric generator which has a casing that envelops a stator and a rotor, the method comprising:
   inspecting the casing inside through an aperture of the casing during generator operation;

moving a covering to expose the aperture;
inserting at least one sensor through the aperture to position the sensor adjacent a transparent element positioned within the aperture after moving the covering to expose the aperture; and
wherein the inspecting of the casing inside through the aperture of the casing during generator operation comprises:
monitoring the casing inside using the sensor after the sensor is inserted through the aperture while the generator is operating.

15. The method of claim 14, wherein the sensor is a camera.

16. A method for inspecting an electric generator which has a casing that envelops a stator and a rotor, wherein the electric generator has internal first sensors housed within the casing, the internal first sensors being connected to guides within the casing, the method comprising:
inspecting the casing inside through an aperture of the casing during generator operation;
inserting at least one second sensor through the aperture; and
wherein the inspecting of the casing inside through the aperture of the casing during generator operation comprises:
monitoring the casing inside using the second sensor after the second sensor is inserted through the aperture while the generator is operating.

17. A method for inspecting an electric generator which has a casing that envelops a stator and a rotor, the method comprising:
inspecting the casing inside through an aperture of the casing during generator operation, wherein the inspecting of the casing inside through the aperture of the casing during generator operation comprises:
introducing at least one sensor through the aperture;
attaching the sensor to a guide in the casing inside after the sensor is introduced through the aperture of the casing; and
using the sensor to measure or monitor the casing inside during generator operation after the sensor is attached to the guide.

18. A method for inspecting an electric generator which has a casing that envelops a stator and a rotor, the method comprising:
inspecting the casing inside through an aperture of the casing during generator operation, wherein the aperture of the casing is an aperture defined in a flange connected to the casing and wherein a transparent element is positioned within the aperture, the method also comprising:
moving a covering to expose the aperture;
inserting at least one sensor through the aperture to position the sensor adjacent the transparent element after moving the covering to expose the aperture; and
wherein the inspecting of the casing inside through the aperture of the casing during generator operation comprises one of:
executing measurements using the sensor after the sensor is inserted through the aperture while the generator is operating, and
monitoring the casing inside using the sensor after the sensor is inserted through the aperture while the generator is operating.

* * * * *